United States Patent [19]

Martin

[11] Patent Number: 4,639,865
[45] Date of Patent: Jan. 27, 1987

[54] COMPUTER SYSTEM HAVING CONVERSION OF OPERATION CODES

[75] Inventor: Michael W. Martin, Letchworth, England

[73] Assignee: International Computers Limited, London, England

[21] Appl. No.: 590,962

[22] Filed: Mar. 19, 1984

[30] Foreign Application Priority Data

Mar. 24, 1983 [GB] United Kingdom ............... 8308149

[51] Int. Cl.⁴ .......................... G06F 5/00; G06F 9/30
[52] U.S. Cl. ................................................ 364/200
[58] Field of Search ... 364/200 MS File, 900 MS File

[56] References Cited

U.S. PATENT DOCUMENTS 4,315,321 2/1982 Parks, III et al. ................. 364/900
4,408,274 10/1983 Wheatley et al. .................. 364/200
4,513,174 4/1985 Herman .............................. 364/200

Primary Examiner—Eddie P. Chan
Attorney, Agent, or Firm—Lee, Smith & Zickert

[57] ABSTRACT

In a computer system bytes passing from a store to a processor pass through a memory (PROM). The contents of locations of the memory which are addressed by data bytes and most operation codes are equal to the respective data bytes and operation codes by which they are addressed so that the memory is transparent to them. However, the contents of some locations are not equal to the op-codes by which they are addressed so that those operation codes are converted into different operation codes.

2 Claims, 2 Drawing Figures

COMPUTER SYSTEM HAVING CONVERSION OF OPERATION CODES

This invention relates to computer systems.

A computer system generally comprises a processing unit which, in operation, is arranged to fetch instructions from a store and to execute them. Each instruction normally contains an operation code (hereinafter abbreviated to op-code) which specifies the operation to be performed by the instruction.

In known computer systems, the response of the system to any particular op-code value is usually fixed by the design of the processing unit. However, it would often be an advantage to be able to change the response of the system to some op-code values without having to alter the design of the processing unit. For example, it may be desirable to declare one or more op-codes illegal in certain conditions and to ensure that a suitable error handling routine is executed whenever one of these illegal op-codes occurs. Conversely, it may be desirable to define some specific response to op-codes which would otherwise be undefined.

SUMMARY OF THE INVENTION

According to the invention, there is provided a computer system comprising a processing unit arranged to fetch instructions from a store and to execute them, each instruction containing an op-code, wherein;

(a) each fetched op-code is applied to the address input of a memory, the data output of which is connected to the processing unit, (b) the contents of the majority of the locations of the memory are equal to the respective op-codes by which they are addressed, so that the memory is completely transparent to those op-codes, allowing them to pass to the processing unit without alteration, and (c) the contents of other locations of the memory are different from the respective op-codes by which they are addressed, so that the op-codes which address those locations are converted into different op-codes before being passed to the processing unit.

It can be seen that, by converting selected op-codes in this way, the memory effectively changes the response of the system to those codes, without any changes to the design of the processing unit. For example, if it is desired to declare a particular op-code illegal, the memory is arranged to convert that op-code into an op-code which initiates an error-handling routine.

In a preferred form of the invention, each location of the memory contains one or more further bits which may be used to control hardware in the system. This allows the effect of selected op-codes to be extended as required, effectively extending the instruction set of the system. For example, a further bit in each location may be used to set or reset a privilege level indicator which determines whether the system is in a privileged level of operation. In this way, it can be arranged that the privileged level of operation can be entered only by using certain specified op-codes. This ensures that entry to the privileged level is strictly controlled. Alternatively, or additionally, the further bits may control other hardware action such as setting a jump counter or diagnostic flags.

In a particular form of the invention, the memory may be addressed by one or more further address bits, in addition to the op-code. For example, these further address bits may specify the current level of operation of the system. This permits, for example, different combinations of op-codes to be declared illegal at different levels of operation.

Preferably, all information items fetched from the store (not only the op-codes) are transferred to the processing unit by way of the memory. In this case, the memory receives as further addres bits a signal which specifies whether or not the information item currently applied to it is an op-code, so that a first portion of the memory is selected when the information is not an op-code, and a second portion is selected when it is an op-code. The contents of all the locations in the first portion of the memory are set equal to their respective addresses, so that the memory is completely transparent to all information items which are not op-codes, allowing them to pass to the processing unit without alteration.

DESCRIPTION OF THE DRAWINGS

One data processing system in accordance with the invention will now be described by way of example with reference to the accompanying drawings of which.

DESCRIPTION OF THE PREFERRED EMBODIMENT

Overall view of system

Figure 1:
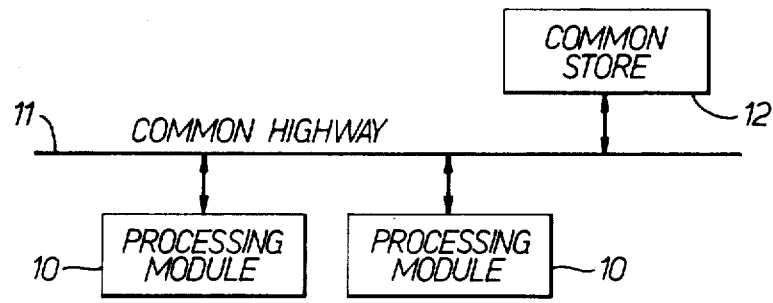
FIG. 1 shows the complete system.

Referring to FIG. 1, the processing system comprises a plurality of processing modules 10 connected by means of a common highway 11 to a common store 12. Each processing module includes a local store which contains data (i.e. program instructions and operands) for exclusive use by that module. The common store 12, on the other hand, contains data which is shared among the processing modules. In particular, the common store is used to hold messages for passing from one processing module to another; all communication between the modules takes place by way of the common store.

Processing Module

Figure 2:
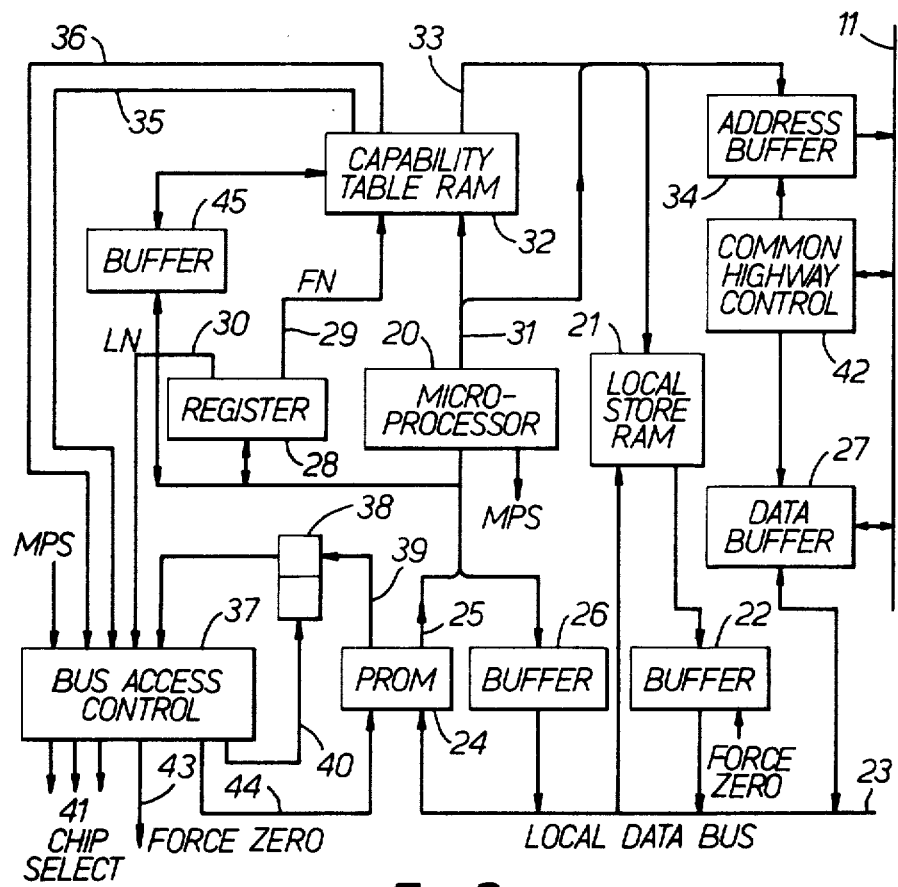
FIG. 2 shows one of the processing modules of the system in more detail.

Referring to FIG. 2, the processing module is based on a microprocessor 20. This may for example be an INTEL 8085 single-chip microprocessor. Details of this microprocessor are available from the manufacturer's literature and form no part of the present invention, and so will not be described in detail.

The microprocessor 20 is designed to execute instructions, each instruction containing an 8-bit op-code. Details of the op-codes and their interpretation form no part of the invention and reference is made to the manufacturer's manuals for further details. Most of the 256 possible combinations of 8 bits are defined as op-codes. However, several possible combinations are undefined i.e. they have no defined meaning to the microprocessor 20. In the present system, two of these undefined combinations (00101000 and 11011101) are used by the system for a special purpose to be described later. These two combinations will be referred to herein by mnemonic names PXRET and PXJMP respectively.

There are eight special op-codes RSTO–RST7 which are interpreted by the microprocessor as calls to a set of fixed locations in the store. In the present system, the op-codes RSTO–6 are used for calling the supervisory program of the system, while RST7 is used as an error handling op-code.

The processing module contains 128K byte random access store (RAM) 21 which serves as the local store of the module. The data output of the RAM 21 is connected by way of a buffer 22 to an eight-bit (i.e. one byte) wide local data bus 23. The local data bus is connected to the eight least significant bits of the address input of a programmable read-only memory (PROM) 24, having an eight-bit wide output path 25 which is connected to the data input/output of the microprocessor 20. As will be explained in more detail later, the PROM 24 operates mainly in a transparent mode such that the majority of bytes applied to it from the local data bus pass through it to the output path 25 without alteration. However, the PROM 24 alters the value of certain op-codes, so as to convert them into different op-codes.

Data output from the microprocessor 20 can be transferred by way of a buffer 26 and the local data bus 23 to the data input of the RAM 21. Data can also be transferred in either direction between the local data bus 23 and the common highway 11 by way of a buffer 27.

The processing module is arranged to support up to 16 independent functions (i.e. programs) concurrently. Each function has a 4-bit function number FN and also a 2-bit level number LN. The level number specifies one of three possible levels for the function as follows:

TABLE 1

| LN | LEVEL |
|---|---|
| 00 | User level 0 |
| 01 | User level 1 |
| 10 or 11 | privilege level |

The two user levels (0 and 1) are non-privileged levels which are used for ordinary programs, whereas the privilege level is reserved for the supervisory program of the system.

The function number FN and level number LN of the currently active function are stored in a register 28. The function number is available from this register over path 29, while the level number appears on path 30.

The microprocessor 20 has a 16-bit address output 31. The six most significant bits of this address are regarded as a virtual page number, defining one of 64 virtual data pages available to the currently active function, while the ten least significant bits specify the location of an individual data byte within the chosen page.

The most significant six bits are combined with the 4-bit function number FN to produce a 10-bit address. This is fed to the address input of a RAM 32, referred to as the capability table. This holds 1024 sixteen-bit words, referred to as capabilities, one for every page belonging to each of the 16 functions.

The format of each of these capabilities is as follows:

| Bits 0-2 | access rights |
|---|---|
| Bit 3 | spare |
| Bits 4-5 | area code |
| Bits 6-15 | page pointer |

The interpretation of the access right, bits is as follows:

TABLE 2

| value | access rights non-privileged | access rights privileged |
|---|---|---|
| 000 | NA | NA |
| 001 | R/E | R/W/E |
| 010 | R | R |
| 011 | R/W | R/W |
| 100 | R/E | NA |
| 101 | NA | R/E |
| 110 | NA | R/W |
| 111 | NA | R/W/E |

Where
R = read
W = write
E = execute
NA = no access

Thus, for example, if a capability contains the access rights value 101, the corresponding page can be read or executed (but not written to) by programs at the privileged level, but cannot be accessed at all by programs at the non-privileged levels.

The area code bits point to the hardware unit which contains the page in question. For example, code 01 points to the RAM 21 (i.e. local store) while code 11 points to the common store 12.

The page pointer field of the currently addressed capability is read out of the capability table 32 on path 33 and is combined with the 10 least significant bits of the address output 31, to produce a 20-bit address. This address can be used for addressing the local store RAM 21, or can be used to address the common store 12, by way of an address buffer 34 and the common highway 11. In the case of the local store RAM 21, however, only the seventeen least significant bits of this address are used.

The access rights field and the area code field of the currently addressed capability are read out over respective paths 35, 36 and are fed to a bus access controller circuit 37. The circuit 37 also receives the level number LN from the register 28 and a microprocessor status signal MPS from the microprocessor 20. The latter signal indicates, amongst other things, whether the microprocessor is attempting to read, write or execute a data byte.

The bus access controller 37 also receives the output of a flip-flop 38. This acts as a level indicator. When in a first state, it indicates that the processor is in the privileged level of operation (irrespective of the value of the level number LN), and when in a second state, it indicates that the processor is in the level defined by the level number LN. The flip-flop 38 is controlled by a signal on line 39 from the PROM 24; when this signal is "1", the flip-flop is set into the first state (forced privileged mode) and when "0" into the second state. However, the flip-flop 38 is allowed to change state only when clocked by a signal on line 40 from the bus access controller 37.

The bus access controller performs the following functions:

(1) It takes the area code on path 36 and produces a signal on one of a number of chip select lines 41 so as to enable the device which contains the required data. For example, if the area code is 01, the local store RAM 21 is enabled. If the area code is 11, a common highway control unit 42 is enabled, permitting access to the common store 12 over the highway 11.

(2) It takes the level number LN, the output of the flip-flop 38, and the microprocessor status signal MPS and determines from these whether there is any violation of the access rights, as specified in Table 2 above. If there is a violation, the controller 37 produces an output signal on line 43. This signal is fed to the buffer 22, forcing the contents of the buffer to zero. If the microprocessor was attempting to execute an op-code, this is interpreted as a null op-code, causing it to take no action. The signal on line 43 also interrupts the microprocessor to signal the error.

(3) It takes the level number LN, the output of the flip-flop 38, and the microprocessor status signal MPS and produces a 2-bit mode control signal on path 44, as follows:

TABLE 3

| Mode control signal | Meaning |
| --- | --- |
| 10 | not an op-code |
| 11 | op-code & privilege level |
| 10 | op-code & user level 0 |
| 11 | op-code & user level 1 |

This mode control signal is fed to the two most significant bits of the address input of the PROM 24.

(4) The controller 37 also produces a clock signal on line 40 whenever the microprocessor status signal MPS indicates that an op-code is being accessed for execution.

Conveniently, the bus access controller 37 may be implemented in the form of a programmable read-only memory (PROM) suitably programmed to perform the functions described above. In this case, the various inputs to the controller would be combined to form an address for the PROM, and the various outputs would be obtained from the data output of the PROM.

PROM 24

The PROM 24 contains 1024 locations, and has a 10-bit address input. The two most significant bits of the address are provided by the mode control signal on path 44, while the eight least significant bits are provided by the byte on the local data bus 23. Each location in the PROM 24 contains nine bits. The first eight bits form a data byte which appears on the output path 25 when the location is addressed. The ninth bit is a tag bit which appears on the path 39.

The PROM is effectively divided into four regions, which are selected according to the value of the mode control signal which provides the two most significant address bits.

When the mode control signal is 00 (i.e. the input byte is not an op-code) the first region of the PROM is selected. The data byte stored in each location of this region is equal to the eight least significant bits of the address of that location. Hence, in this mode, the PROM is completely transparent to all input data bytes i.e. any data byte appearing on the local data bus 23 is passed unaltered to the path 25.

In a similar manner, the PROM 24 is completely transparent to the majority of op-codes at any level of operation.

Several op-codes are considered illegal. The locations in the PROM 24 addressed by these illegal op-codes contain the error op-code RST7. Thus, the illegal op-codes are all converted by the PROM 24 into the error op-code. This causes a jump to the start of the error handling routine, and prevents any attempt to execute the illegal op-code.

Op-codes may be considered illegal for various reasons. One reason is that the op-code is undefined i.e. has no defined meaning to the microprocesor 20. However, it should be noted that the two undefined op-codes mentioned previously, PXRET and PXJMP are not considered illegal in the present system; the manner in which they are dealt with will be described below. Other op-codes are considered illegal at specified levels of operation because they would endanger the operation of the system if their use was unrestricted. For example, the op-code DI (disable interrupts) is declared illegal at the non-privileged levels. The reason for this is that if a non-privileged program were allowed to use the DI code, it might make the system inoperable. Only well-tested and trusted programs (at the privileged level) are allowed to use this code.

In general, the tag bit of each location in the PROM is set to the value appropriate to the level implied by the mode control bits 44. Thus, the majority of the tag bits in the second region of the PROM (mode control bits=01) are set to "1", appropriate to the privilege level, while the majority of the tag bits in the third and fourth regions (mode control bits=10 and 11) are set to "0", appropriate to the non-privileged levels. Thus, once the level indicator flip-flop 38 has been set to a particular state, the tag bits read out of the PROM 24 on line 39 will normally maintain the flip-flop in the same state. The exceptions to this general rule are as follows:

(1) The tag bits of those locations which are addressed by illegal op-codes (e.g. DI at non-privileged level) are set to "1". Thus, an illegal op-code forces the processor into the privileged level, in addition to initiating the error routine.

(2) The locations addressed by the op-codes RSTO-6 at the non-privileged levels contain the tag bit "1". Thus, when RSTO-6 occurs, the privileged level is forced. (The op-code itself is passed unaltered to the microprocessor). Hence, the op-codes RSTO-6 provide a means (the only means, in fact) for a non-privilege program to call a program at the privileged level. This ensures strict control over entry to the privileged level.

(3) The op-codes PXRET and PXJMP (which, as mentioned above, are undefined as far as the microprocessor is concerned) are converted by the PROM to the defined op-codes RET (return) and JMP (jump), and the tag bits of the locations addressed by these op-codes are both set to "0". These two op-codes therefore provide a means for returning from a forced privileged level to the level defined by the level number LN.

Finally, it should be mentioned that the data input/output of the capability table 32 is connected to the data input/output part of the microprocessor 20, by way of a buffer 45. This permits the microprocessor to modify the contents of the capability table e.g. in order to transfer the access rights to a particular page of data from one function to another. The capability table can be accessed only by use of a particular op-code which is defined as legal only at the privileged level, so as to ensure that the capability table can only be altered by the supervisory program.

Some possible modifications

It will be appreciated that many modifications may be made to the system without departing from the spirit of the invention. For example, the system may be provided with more than three levels of operation. Also, the PROM 24 may have more than one tag bit for each location, and these tag bits may be used to perform various functions, such as setting control bits or hardware diagnostic flags.

What is claimed is:

1. A computer system comprising:
   (a) a store for holding instructions, each of said instructions includes an op-code,
   (b) an op-code conversion memory having a plurality of locations, each of said locations contains an op-code value and a control signal.
   (c) means for fetching instructions from the store and for utilizing the op-code of each instruction to address the op-code conversion memory to thereby read out an op-code value from one of the locations of the op-code conversion memory, and
   (d) a processing unit connected to said op-code conversion memory, for receiving and executing each op-code value read out of the op-code conversion memory,
   (e) the op-code values held in a majority of the locations of the op-code conversion memory being equal to the respective op-codes by which they are addressed, those op-codes therefore being passed to the processing unit for execution without modification,
   (f) the op-code values held in a minority of the locations of the op-code conversion memory being different from the respective op-codes by which they are addressed, those op-codes therefore being converted into different op-code values before being passed to the processing unit for execution,
   (g) the system also including priviledge level indication means having a first state indicating a privileged level of operation and a second state indicating a non-privileged level of operation, the privilege level indication means being connected to receive said control signal from the op-code conversion memory and to provide an output signal thereto; and
   (h) means for setting the privilege level indication means to said first state whenever said control signal has a first value, and to said second state whenever said control signal has a second value.

2. A computer system as claimed in claim 1 including means responsive to said privilege level indication means for selecting a first region of said op-code conversion memory when the privilege level indication means is in said first state, and for selecting a second region of said op-code conversion memory when the privilege level indication means is in said second state.

* * * * *